United States Patent
Kimura et al.

(12)

(10) Patent No.: US 6,411,497 B2
(45) Date of Patent: Jun. 25, 2002

(54) SEPARATOR FOR ELECTRIC DOUBLE-LAYER CAPACITOR

(75) Inventors: Kouji Kimura, Sowa-machi; Fuminori Kimura, Tokyo; Takeshi Kobayashi, Sowa-machi, all of (JP)

(73) Assignee: Japan Vilene Co., Ltd., Tokyo (JP)

( * ) Notice: Subject to any disclaimer, the term of this patent is extended or adjusted under 35 U.S.C. 154(b) by 0 days.

(21) Appl. No.: 09/739,004

(22) Filed: Dec. 19, 2000

(30) Foreign Application Priority Data

Dec. 24, 1999 (JP) ........................................ 1999-366543
Nov. 10, 2000 (JP) ........................................ 2000-343927

(51) Int. Cl.$^7$ ............................. H01G 9/00; H01G 9/02
(52) U.S. Cl. ...................... 361/502; 361/512; 361/503
(58) Field of Search ................................ 361/502, 503, 361/508, 516

(56) References Cited

U.S. PATENT DOCUMENTS

| | | | |
|---|---|---|---|
| 4,330,602 A | 5/1982 | O'Rell et al. | |
| 5,158,647 A | 10/1992 | Hurley | |
| 6,104,600 A | * 8/2000 | Suhara et al. | ................ 361/502 |
| 6,310,763 B1 | * 10/2001 | Suhara et al. | ................ 361/508 |

FOREIGN PATENT DOCUMENTS

| | | | | |
|---|---|---|---|---|
| JP | 2-66917 | * | 3/1990 | ............ H01G/9/00 |
| JP | 7-95501 | | 10/1995 | |

* cited by examiner

*Primary Examiner*—Dean A. Reichard
*Assistant Examiner*—Eric W. Thomas
(74) *Attorney, Agent, or Firm*—Oliff & Berridge PLC

(57) ABSTRACT

A separator for an electric double-layer capacitor with an excellent property of preventing a short circuit between the electrodes, a good ionic permeability and a high strength is provided by a fiber sheet including a fibril-containing fiber and a fine polyester fiber having a fineness of not more than 0.45 dtex (decitex).

7 Claims, No Drawings

SEPARATOR FOR ELECTRIC DOUBLE-LAYER CAPACITOR

FIELD OF THE INVENTION

The present invention relates to a separator for an electric double-layer capacitor.

BACKGROUND OF THE INVENTION

An electric double-layer capacitor has a relatively high capacity; moreover, it has a long life and a capability of being quickly charged and discharged. Therefore, it has been used not only for conventional applications such as leveling of power sources and absorption of noises but also as a memory backup power source for personal computers as well as a supplement or substitute for secondary batteries. In recent years, it has been expected to be used as a secondary battery for electric automobiles.

This electric double-layer capacitor has such a structure that a pair of electrodes is dipped in an ionic solution. When a voltage is applied to this electric double-layer capacitor, ions having an opposite sign to an electrode will be distributed near the electrode to form a layer of the ions while charges having an opposite sign to the ion will be accumulated within the electrode. Then, when a load is placed across the electrodes, the charges within the electrode will be discharged and, at the same time, the ions distributed near the electrode will leave therefrom whereby a neutral state will return.

When a pair of electrodes touch in such an electric double-layer capacitor, the formation of an ion layer near the electrode becomes difficult. Therefore, a separator is usually placed between each electrode pair. This separator is required to have not only a property of preventing the short circuit between the electrodes but also an excellent ionic permeability. For satisfying the first requirement, i.e., for being excellent in the property of preventing the short circuit between the electrodes, it is desired that the separator should have not only a high weight per unit area but also a better thickness. However, when the separator is of a high weight per unit area and thick as such, the capacity tends to reduce due to the disturbance of its ionic permeability and, therefore, such a one is practically unusable. When a thin separator of a low weight per unit area is used for increasing the ionic permeability, a short circuit between the electrodes is apt to take place; moreover, the strength of the separator tends to reduce whereby such a thing would be hard to handle. In order to improve the strength, there has been a proposal for a method in which a thermally fusible fiber is contained as a constituent fiber for the separator and the said fusible fiber it is subjected to a thermal fusion. However, when the separator is prepared by that method, a coat is formed therein by the thermal fusion and, therefore, the ionic permeation becomes bad in spite of making the weight per unit area and the thickness low with an object of improving the ionic permeability.

SUMMARY OF THE INVENTION

The separator of the present invention for an electric double-layer capacitor has an excellent property of preventing the short circuit, a good ionic permeability and a high strength. Since the separator is excellent in heart resistance as well, it is suitable for the manufacture of electric double-layer capacitors.

When the fibril-containing fiber is formed from a resin having a melting or carbonizing temperature of 300° C. or higher, its heat resistance is excellent. Therefore, the separator is suitable for the manufacture of electric double-layer capacitors.

Further, when none of the separator constituents for electric double-layer capacitors is thermally fused, the separator is excellent in ionic permeability.

Furthermore, when the fiber sheet consists of the wet-laid nonwoven fabric, the uniform dispersing property of the fiber is excellent whereby separator's reliability is high without resulting in a short circuit.

The present invention has been made for solving the above-mentioned problems. An object of the present invention is to provide a separator for an electric double-layer capacitor, said separator having an excellent property of preventing a short circuit between electrodes, a remarkable ionic permeability and a quite good strength.

The separator for electric double-layer capacitors according to the present invention (hereinafter, referred to as "separator") is formed from a fiber sheet comprising a fibril-containing fiber (hereinafter, referred to as "fibril fiber") and a fine polyester fiber having a fineness of not more than 0.45 dtex (decitex). The following has now been founds (1) since such a separator of the present invention is capable of having a densified structure relying on both the fibril fiber and the fine polyester fiber even if it is low in weight per unit area and thin, the separator has an excellent property of preventing a short circuit; (2) the separator is capable of forming fine micropores having an excellent ionic permeability due to the presence of the fine polyester fiber; and further (3) the separator has an excellent strength due to an entanglement of fibrils of the fibril fiber.

It has been noted that, since the above-mentioned fine polyester fiber has a softening temperature of about 240° C., thereby exerting an excellent heat resistance, it is possible to remove water at high temperature after assembling from the materials in the manufacture of the electric double-layer capacitor, thereby giving advantages in view of appropriate manufacturing processes.

When the above fibril-containing fiber is formed from a resin having a melting or carbonizing temperature of not lower than 300° C., its heat resistance is excellent. Therefore, water can be removed at high temperature after assembling from the materials in the manufacture of the electric double-layer capacitor, thereby giving an advantage in terms of appropriate manufacturing processes. Especially in the case of a fibril fiber formed from an aromatic polyamide, there are advantages that not only its affinity with electrolytes but also its ionic permeability is excellent.

When no separator constituents for electric double-layer capacitors are thermally fused, the separator is free from forming a coat, thereby leading to an excellent ionic permeability.

When the above-mentioned fiber sheet is composed of a wet-laid nonwoven fabric, the fiber has an excellent uniform dispersibility, thereby giving a high reliability free of short circuiting.

DETAILED DESCRIPTION OF THE INVENTION

The separators of the present invention are capable of having a densified structure by entangling the fibrils of the fibril fiber, thereby providing not only an excellent strength but also an excellent property of preventing the short circuit.

The fibril fiber is a fiber wherein numerous fine fibers are formed from one fiber. The fibril fiber may be composed of fine fibers alone or may contain portions forming a bundle of fine fibers, together with the fine fibers. When a fibril fiber containing portions forming a bundle of fine fibers in addition to the fine fibers is contained therein as in the latter case, it not only has an excellent strength but also shows an excellent ionic permeability due to a synergistic action with the fine polyester fiber as mentioned hereinbelow. Therefore, it can be appropriately used.

Although this fibril fiber may be formed from any resin, it is suitable for the manufacture of an electric double-layer capacitor when it is formed from a resin having a melting or carbonizing temperature of 300° C. or higher.

For example, when each material (such as a current collector electrode, an electrode and a separator) for an electric double-layer capacitor wherein an organic electrolyte liquid is employed contains water, it is difficult to manufacture an electric double-layer capacitor having a high withstand voltage or an electric double-layer capacitor having a high density. Therefore, it is necessary to dry each material well. However, both a prior art separator composed of conventionally used polypropylene fibers and a prior art separator composed of cellulose pulps are less heat resistant as compared to other materials. Accordingly, when they are dried at the temperature of 150° C. or higher after assembling the current collector electrode, the electrode and the separator, there is a significant deterioration (including fusion and carbonization) of the separators. Therefore, it has been difficult to dry all the materials simultaneously after assembling therefrom. For these reasons, each material may be successfully assembled only after well drying; however, there has been a problem that it takes too much time to assemble the materials after each material is thoroughly dried.

Now, when a fibril fiber formed from a resin having the above-mentioned melting or carbonizing temperature is used as the constituent fibril fiber for separators, it is possible to dry the materials at the temperature of 150° C. or higher simultaneously after assembling the current collector electrode electrode, the electrode and the separator whereby it is now possible to easily, conveniently manufacture an electric double-layer capacitor having a high withstand voltage and an electric double-layer capacitor having a high energy density.

The term "melting temperature" as used herein refers to a temperature determined from a differential thermal analysis curve (DTA curve) obtained by a differential thermal analysis as prescribed by JIS K 7121. The term "carbonizing temperature" as used herein refers to a temperature determined by means of a thermogravimetric measurement as prescribed by JIS K 7120.

The resin having a melting temperature of not lower than 300° C. includes, for example, polytetrafluaroethylenes, polyphenylene sulfides, etc. The resin having a carbonizing temperature of not lower than 300° C. includes, for example, meta-type aromatic polyamides, pars-type aromatic polyamides, polyamideimides, aromatic polyether amides, polybenzimidasoles, all-aromatic polyesters, etc. Among them, the meta-type aromatic polyamides and the para-type aromatic polyamides can be appropriately used due to their good affinity to the electrolyte. The pars-type aromatic polyamides having a higher carbonizing temperature are more preferable.

Such a fibril fiber is preferably contained in the fiber sheet at not less than 20 mass %, and more preferably not less than 50 mass %, so as to give not only an excellent strength but also an excellent property of preventing the short circuit.

On the other hand, in view of the relation to the fine polyester fiber which will be mentioned hereinbelow, it is preferably not more than 95 mass %, and more preferably not more than 90 mass %.

It is not necessary that fibril fibers of one kind are contained in the fiber sheet but it is allowable that fibril fibers of two or more kinds are contained therein. When fibril fibers of two or more kinds are contained, their total amount is preferably within the above-mentioned range.

The separator of the present invention contains fine polyester fibers having a fineness of not more than 0.45 dtex in combination with fibril fibers as aforementioned, whereby it is possible to form fine micropores having an excellent ionic permeability.

When the fineness of the fine polyester fiber exceeds 0.45 dtex, the formed pore diameter tends to become big and the preventive property for short circuiting also tends to become significantly bad. The fineness is more preferably not more than 0.35 dtex, still more preferably not more than 0.25 dtex, and most preferably not more than 0.15 dtex. Although there is no particular limitation for the lower limit, it is preferable to be around 0.10 dtex. The term "fineness" as used herein refers to a value obtained by the Method A as prescribed by JIS L 1015.

Since the softening temperature of this fine polyester fiber is about 240° C., it is appropriate for the manufacture of an electric double-layer capacitor by the same reason as in the case where the above-mentioned fibril fiber is formed from the resin having a melting or carbonizing temperature of not lower than 300° C.

The term "softening temperatures" an used herein refers to a temperature giving the initiating point of a melting endothermic curve in a DSC curve obtained by a heat flux differential scanning calorimetry (DSC; rising rate: 10° C./minute) as prescribed by JIS K 7121.

The fiber length of the fine polyester fiber according to the present invention is not particularly limited but varies depending upon the embodiments of the fiber sheet. When the fiber sheet of the present invention is composed of an appropriate wet-laid nonwoven fabric, the fiber length is preferably about 1 to 25 mm, or more preferably about 3 to 20 mm. The fiber length as used herein refers to a length determined by the Method B of JIS L 1015 (a corrected staple diagram method).

It is not necessary that the fine polyester fiber is circular in cross section but it is allowable that it is non-circular (such as long circular, elliptic, star-shaped, alphabet-shaped including Y- or X-shaped and cross-shaped) in cross section.

It is preferable that such a fine polyester fiber is contained in the fiber sheet at not less than 5 mass %, or more preferably not less than 10 mass %, so as to give an excellent ionic permeability. On the other hand, in view of the relation to the above-mentioned fibril fiber, it is preferably not more than 80 mass %, and more preferably not more than 50 mass %.

It is not necessary that fine polyester fibers of one kind are used but it is allowable that fine polyester fibers of two or more kinds are contained therein which may differ each other or one another in fiber diameter and/or resin composition. When fine polyester fibers of two or more kinds are contained as such, the total mass is preferably within the aforementioned range.

The separator of the present invention comprises a fiber sheet containing a fibril fiber and a fine polyester fiber as aforementioned. Embodiments of the fiber sheet may include, for example, textiles, knitted goods, nonwoven fabrics and composite products thereof. Among them, nonwoven fabrics capable of being made thin are preferred. More preferably wet-laid nonwoven fabrics can be employed which have an excellent uniform fiber dispersibility, a resistance against short circuiting and a high reliability.

It is particularly preferred that, in order to achieve an excellent density, property of preventing the short circuit, ionic permeability or strength, the separator has two or more layers having fiber orientations which may be same or different. It is further preferred that the separator has two or more layers having different fiber orientations in order to obtain an excellent balance in strength in addition to the above-mentioned properties. It is especially preferred that the separator has three or more layers having fiber orientations which are individually different one another. In the case where there is any combination of adjacent layers having different fiber orientations when three or more layers are present, such a case is defined that the fiber orientations are different.

It is preferred that none of the constituents (for example, fibril fibers, fine polyester fibers, etc.) for the separator of the present invention are thermally fused. As a result of not being thermally fused as such, the separator is free from forming a coat whereby its ionic permeability is excellent.

The thickness of the separator is preferably not more than 50 μm, and more preferably 15 to 45 μm, so as to give an excellent ionic permeability. The weight per unit area of the separator is preferably 5 to 30 g/m² while the apparent density thereof is preferably 0.1 to 1.2 g/cm³.

With regard to the separator of the present invention, a fiber sheet is manufactured by conventional methods and the said fiber sheet may be used as the separator.

For example, an appropriate wet-laid nonwoven fabric can be manufactured as follows:

First, at least fibril fibers and fine polyester fibers are prepared. Both fibril fibers and fine polyester fibers are available in the market. Therefore, they are easily obtainable.

Next, those fibers are subjected to a conventional wet-laid web-forming method (such as horizontal long net web-forming method, inclined wire type short net web-forming method, circular net web-forming method in-order flow circular net and out-order flow circular net-combination web-forming method, in-order flow circular net and circular former-combination web-forming method, out-order flow circular net and circular net former-combination web-forming method, short net and circular net-combination web-forming method or long net and circular net-combination web-forming method) to form a fiber web. In the formation of the fiber web, a thickener may be added so as to maintain the uniformly dispersed state of the fibers, a surface-active agent may be added so as to improve the affinity of the fibers with water or a antifoaming agent may be added so as to remove foams generated upon stirring, etc.

Then the fiber web is dried to remove water. As a result, a wet-laid nonwoven fabric can be prepared, The drying is carried out at the temperature at which the constituent fibers for the fiber web do not happen to melt.

Although the wet-laid nonwoven fabric thus prepared can be used as the separator, it is preferable that this wet-laid nonwoven fabric is further compressed using a calender or the like. By application of compression as such, it is possible that (1) the thickness is adjusted, or made thin or uniform, (2) the fibril fiber is further fibrillated to give a more densified product or (3) fibrils of the fibril fiber are closely contacted, or adhered, to improve the strength.

Upon applying the compression, the fiber sheet may be either heated or non-heated although the above-mentioned effect is readily achieved when heated. However, if heating is carried out to such an extent that the constituent fibers are melted, a coat is formed and the ionic permeability is deteriorated, Therefore, in the case of heating, it is necessary to heat at the temperature which is 20° C., or more preferably 30° C., lower than the melting temperature of the resin having the lowest melting temperature among constituent resins for fibers constituting the separator, Preferred embodiments of the separator according to the present invention have two or more layers with fiber orientations which may be same or different. Such embodiments may be manufactured, for example, by layering two or more wet-laid fiber webs. In more specific embodiments, wet-laid fiber webs prepared using nets of a kind are layered. Further, wet-laid fiber webs prepared using nets of different kinds (such as a combination of a short net and a circular net; or a combination of a long net and a circular net) are layered. Among them, a method where the wet-laid fiber webs prepared using nets of different kinds are layered is appropriate because a separator having two or more layers with different fiber orientations can be readily manufactured.

It is also possible to manufacture the similar separator even when the wet-laid fiber webs are dried, layered and compressed with heating. However, a method where the wet-laid fiber webs in a wet state are layered facilitates the manufacture of a separator having better ionic permeability if the weight per unit area the thickness and the state of fiber orientation are same.

Particularly preferred embodiments of the separator according to the present invention have three or more layers with different fiber orientations Such embodiments can be readily manufactured by an appropriate combination selected from the group consisting of short net, long net, in-order flow circular net, out-order flow circular net and circular net former. For instance, separators with 3 layers can be manufactured by a combination of a circular net, a circular net former and a circular net.

The separator of the present invention can be used for electric double-layer capacitors wherein said separator can be placed between a pair of electrodes. When the constituent fibers for the separator contains a fibril fiber made up from a resin having a melting or carbonizing temperature of not lower than 300° C., the whole can be dried after assembling the materials. Such separators are suitable for the manufacture.

DESCRIPTION OF THE PREFERRED EMBODIMENTS

Described below are examples of the present invention which are provided only for illustrative purposes, and not to limit the scope of the present invention.

EXAMPLES

Example 1

Fibril fibers formed from para-type aromatic polyamide (Registered Trademark; KEVLAR, Du Pont; carbonizing temperature: not lower than 500° C.) and fine polyester fibers formed from polyethylene terephthalate (fineness: 0.11 dtex, fiber length: 3 mm, melting temperature: 260° C., softening temperature: 253° C., cross sections circular) were prepared, Next, a slurry containing the fibril fibers and the fine polyester fibers at a mass ratio of 1:1 was formed and subjected to web-forming processes using an inclined wire type short net system to form a fiber web. Then this fiber web was dried by a hot-air circulating drier set to the temperature of 120° C. Thereafter, the dried fiber web was compressed (linear pressures 4.7 kN/cm) by a pair of hot calenders set to the temperature of 220° C. to manufacture a compressed wet-laid nonwoven fabric (i.e. separator) having a weight per unit area of 20 g/ml, a thickness of 25 $\mu$m and an apparent density of 0.8 g/cm$^3$. The constituent fibril fibers for this separator contained the part where the fine fibers were in a bundle, Although the constituent fine polyester fibers for the separator were a bit adhered by pressure, they were thermally nonfused and, therefore, free from forming a coat.

Comparative Example 1

The procedures (i.e., fiber web formation, drying and compression with a pair of hot calenders) of Example 1 were repeated except that 50 mass % of polyethylene terephthalate fibers with a fineness of 0.77 dtex and a fiber length of 3 mm (melting temperature: 260° C.; softening temperature: 253° C.; cross section: circular) was used in place of the fine polyester fiber of Example 1. As a result, a compressed wet-laid nonwoven fabric (i.e., separator) having a weight per unit area of 20 g/m$^2$, a thickness of 25 $\mu$m and an apparent density of 0.8 g/cm$^3$ was manufactured.

Comparative Example 2

The procedures (i.e., fiber web formation, drying and compression with a pair of hot calenders) of Example 1 were repeated except the use of 100% of fibril fibers formed from para-type aromatic polyamide as used in Example 1. As a result, a compressed wet-laid nonwoven fabric (i.e., a separator) having a weight per unit area of 20 g/m$^2$, a thickness of 25 $\mu$m and an apparent density of 0.8 g/cm$^3$ was manufactured.

Example 2

A fiber web manufactured in the entirely same manner as in Example 1 was dried by a hot-air circular drier set to the temperature of 120° C. Then the dried fiber web was compressed (linear pressure: 4.7 kN/cm) by a pair of hot calenders set to the temperature of 240° C. to manufacture a compressed wet-laid nonwoven fabric (i.e., separator) having a weight per unit area of 20 g/m$^2$, a thickness of 25 $\mu$m and an apparent density of 0.8 g/m$^3$. The constituent fibril fibers for this separator contained the part where the fine fibers were in a bundle. Although the constituent fine polyester fibers for the separator were a bit adhered by pressure, they were thermally nonfused and, therefore, free from forming a coat.

Measurement of Resistance

Materials were prepared: a kneaded mixture of granular activated carbon, carbon black and polytetrafluoroethylene as an electrode, aluminum foil as a current collector electrode, each product of Examples 1 & 2 and Comparative Examples 1 & 2 as a separator, and a solution of tetraethylammonium tetrafluoroborate dissolved in propylene carbonate as an electrolyte, respectively. Then, coin cell type electric double-layer capacitors were manufactured from those materials and each inner resistance was measured for a respective separator. The results are as shown in Table 1.

TABLE 1

|  | Resistance ($\Omega$) |
| --- | --- |
| Example 1 | 2.7 |
| Comparative Example 1 | 3.1 |
| Comparative Example 2 | 3.3 |
| Example 2 | 2.7 |

It is apparent from Table 1 that the separator of the present invention has a resistance of lower than 3 $\Omega$ and exerts an excellent ionic permeability, Although the separator of the present invention is as thin as 25 $\mu$m, it can be measured for its resistance without occurrence of short circuit. In addition, coin cell type electric double-layer capacitors can be manufactured using the separator of the present invention without causing the problems such as breakage of the separator. Therefore, the separator is satisfactory in terms of strength

What is claimed is:

1. A separator for an electric double-layer capacitor which comprises a fiber sheet comprising fibers having fibrils and fine polyester fibers having a fineness of not more than 0.45 dtex (decitex).

2. The separator according to claim 1, wherein the fiber having fibrils is formed from a resin having a melting or carbonizing temperature of not lower than 300° C.

3. The separator according to claim 2, wherein any of the constituents for the separator is free of thermal fusion.

4. The separator according to claims 2, wherein the fiber sheet consists of a wet-laid nonwoven fabric.

5. The separator according to claim 1, wherein any of the constituents for the separator is free of thermal fusion.

6. The separator according to claim 5, wherein the fiber sheet consists of a wet-laid nonwoven fabric.

7. The separator according to any of claim 1, wherein the fiber sheet consists of a wet-laid nonwoven fabric.

* * * * *